Jan. 7, 1958 P. A. GROBEY 2,819,127
BEARING STRUCTURE

Filed Nov. 10, 1955 2 Sheets-Sheet 1

Inventor
Paul A. Grobey
by
Robert S. Toperzer, Atty.

Jan. 7, 1958 P. A. GROBEY 2,819,127
BEARING STRUCTURE
Filed Nov. 10, 1955 2 Sheets-Sheet 2

Inventor
Paul A. Grobey
by
Robert S. Topenzer, Atty.

United States Patent Office 2,819,127
Patented Jan. 7, 1958

2,819,127

BEARING STRUCTURE

Paul A. Grobey, Springfield, Vt., assignor to Bryant Chucking Grinder Company, Springfield, Vt., a corporation of Vermont Application November 10, 1955, Serial No. 546,136

7 Claims. (Cl. 308—183)

This invention relates generally to bearings for shafts or spindles, and more particularly it relates to a ball bearing structure wherein special provision is made for axial movement of the spindle.

In designing an anti-friction ball bearing structure for a shaft or spindle, ordinarily some provision must be made for axial movement of the spindle as may be occasioned by various factors, such as thermal expansion. Normally this entails having a considerable amount of radial looseness or play either in the bearings themselves, or between the bearings and the members which retain them. Although in some applications a small amount of radial looseness need be of little concern, in the case of high speed precision spindles, as are often found in machine tools, such looseness is known to be detrimental, since for one thing it adversely affects the precision of the work.

Accordingly, it is an object of the present invention to provide an anti-friction bearing structure which substantially eliminates radial looseness of the spindle and yet permits the spindle to move axially.

In essence, this is accomplished by the novel combination of a first bearing to constrain the shaft to rotate, and a second bearing having inner and outer ball engaging members adapted for relative axial movement, the latter being fixed and the former engaging the first bearing in a manner to constrain the same to move axially. The invention will be more readily understood with reference to the accompanying drawing wherein.

Figure 3:
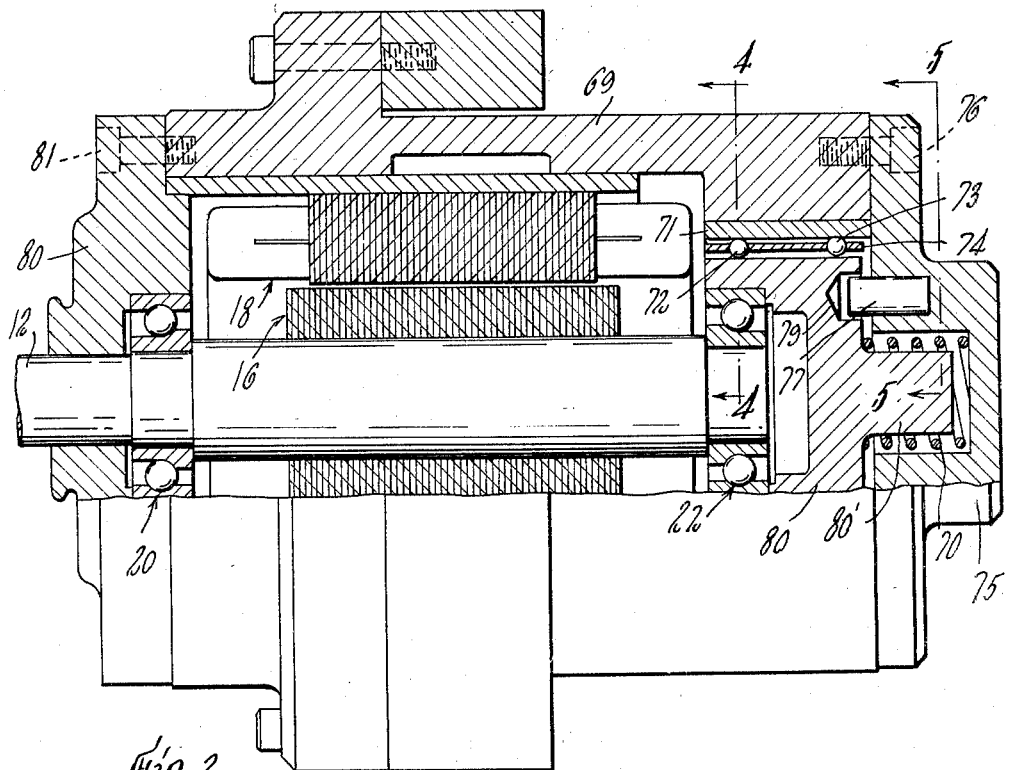
Figure 4:
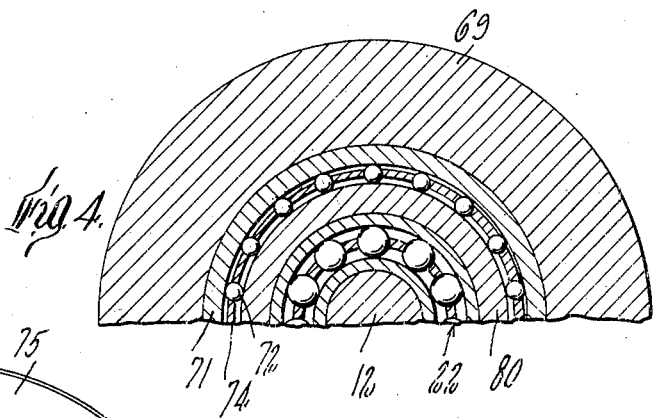
Figure 5:
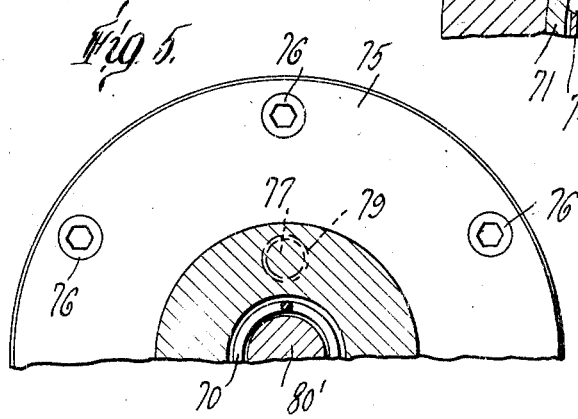

Fig. 3 is a cross-sectional view of a modification of the bearing structure according to the present invention; and Figs. 4 and 5 are sectional views taken on lines 4—4 and 5—5, respectively, of Fig. 3.

Figure 1:
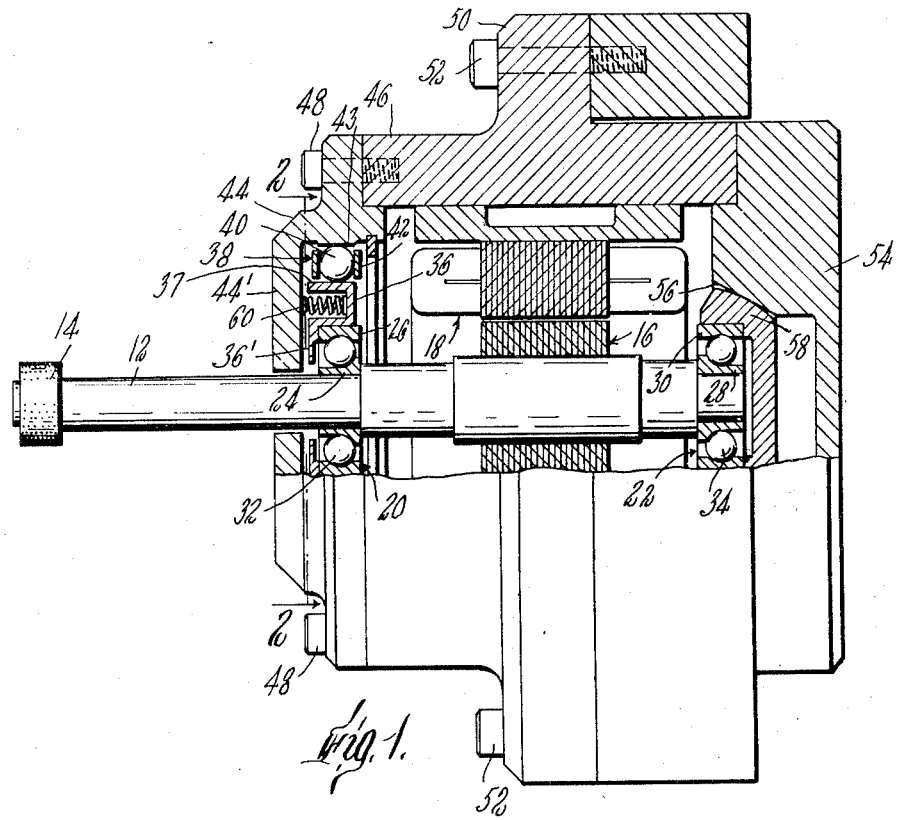
Fig. 1 is a cross-sectional view of the bearing structure according to the present invention.
Figure 2:
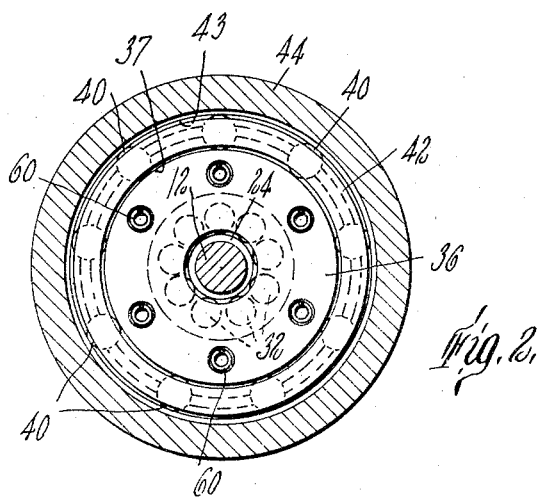
Fig. 2 is a sectional view taken on line 2—2 of Fig. 1.

Referring first to Figs. 1 and 2, it will be observed that the bearing structure of the present invention has been illustrated in conjunction with a spindle or motor shaft 12 mounting a grinding wheel 14, the armature and field assembly of the motor which drives the wheel being designated generally by numerals 16 and 18, respectively. Provided on the shaft 12 are front and rear rotary ball bearings 20 and 22, preferably of the type known as angular contact bearings for supporting both radial and axial load, each having inner and outer rings 24, 26 and 28, 30, respectively, with raceways for the balls which bear the numeral designation 32 in the case of bearing 20, and 34 in the case of bearing 22. Front bearing 20, although fixed radially, is adapted to be moved axially under the influence of the shaft 12 as it grows due to thermal expansion for example, and to this end the outer ring 26 of bearing 20 is fixedly mounted inside an annular cartridge member 36, the outer peripheral surface 37 of which serves as the inner ball engaging raceway for a ball bearing 38 wherein the individual balls 40 are adapted for sliding movement in the direction of the shaft. Member 36 is prevented from rotating by any suitable means well known to those skilled in the art.

The bearing 38 includes in addition to cartridge member 36 and balls 40, a cage or retainer 42 for the balls to space them angularly, and an outer ball engaging raceway 43, as is afforded by the inner peripheral surface of a supporting end cap 44. The balls 40 of the bearing 38 are preferably of slightly larger diameter, say in the order of a few tenths of a thousandths of an inch, than is the separation between inner and outer ball engaging surfaces 37 and 43 to insure that there will be no radial looseness or play whatever between the shaft and its fixed supports. Cap 44 is bolted to one end of a cylindrical housing member 46 with machine bolts 48, the housing 46 in turn being adapted for mounting on the device with which the bearing structure is to be used, such as a machine tool, by the provision of a flanged portion 50 having clearance holes for machine bolts 52.

Formed so as to mate with the opposite end of housing 46, that is the end towards the right of Fig. 1, is another end cap 54 provided with a (straight) tapered bore 56 of somewhat larger diameter than the outer ring 30 of rear bearing 22. A cartridge member 58 which in effect forms a sleeve about the outer ring 30 is disposed within this bore. As shown, the surface of cartridge member 58 in contact with the wall of the bore 56 is preferably provided with a spherical contour to secure proper alignment of the rear bearing 22 with respect to the front bearing 20.

With reference once more to the cartridge member 36 for the bearing 20, it will be observed that the same consists essentially of an annular body rigidly mounted on outer ring 26 and provided with a plurality of blind holes in its front face. Six of these holes are shown by way of example in Fig. 2, each extending parallel to the axis of the member and serving to hold a compression spring 60 to pre-load the bearing 20 and so also the bearing 22 by virtue of the axial thrust of the shaft 12. More particularly, cartridge member 36 has a radially inwardly projecting flanged portion 36' which abuts the front face of outer ring 26 associated with the front bearing 20 so that when the springs 60 are compressed, the bearing and the shaft 12 will be urged towards the right of Fig. 1 causing the rear bearing 22 and its associated (cartridge) member 58 to become firmly seated in the bore 56. As is apparent, the compressive force on the springs is supplied by fixed cap 44 which has a radially projecting flanged portion 44' to engage the end of the springs projecting from the holes.

The manner of operation is as follows: When the shaft heats up in the course of the work being performed by the grinding wheel, it will tend to grow in length, that is to expand axially, and for this reason exert an axial force on the cartridge member 36, through the bearing 20. As a result, member 36 will be urged towards the left of Fig. 1 against the force of springs 60, but with appreciably no other restraint owing to the freedom of movement of cartridge 36 relative to cap 44 as is afforded by the balls 40. It follows, therefore, that according to the invention, expansion of the shaft 12 may occur substantially unimpeded except for the pre-loading effect of the springs 60 and the balls 40, in spite of the fact that there is no radial looseness as is ordinarily the case.

With reference now to Figs. 3, 4 and 5, there is illustrated a modification of the bearing structure of Figs. 1 and 2 wherein bearing 22 is axially movable while bearing 20 is fixed, and the shaft 12 is pre-loaded by means of a single spring 70. More particularly, the bearing structure according to Figs. 3–5 includes a housing member 69, which at its rearward end is bored for a sleeve 71 of hardened steel. Disposed within the sleeve 71 is a cartridge 80 adapted to rigidly hold the bearing 22 and at the same time to engage a pair of axially spaced rows of balls 72 and 73 retained by a cage 74. That is, balls 72 and 73 are disposed between the inner and outer surfaces of sleeve 71 and cartridge 80, respectively, which serve in effect as inner and outer races therefor.

Cartridge member 80 has an axially extending shank portion 80' to retain a compression spring 70, and a rear cap member 75 is provided which has an axial bore therein to receive the spring. Cap member 75 is fastened to the rear end of housing 69 by means of machine bolts 76 and has a pin 77 projecting therefrom into a hole 79 in cartridge member 80 to prevent the latter from rotating.

At the front end of the bearing structure there is a cap 80 which also serves as a cartridge to support the front bearing 20 both axially and radially. To this end, cap 80 is provided with a cylindrical bore into which the bearing 20 is pressed, and is itself rigidly fastened to the front end of housing member 69 by means of machine bolts 81. As is apparent, the operation of the bearing structure of Figs. 3–5 is essentially the same as that described in connection with Figs. 1 and 2 except that the shaft 12 is axially fixed by bearing 20 at the front of the structure, so that when it expands bearing 22 moves rearwardly. As before, relatively free axial movement of the bearing 22 is permitted notwithstanding the fact that there is virtually no radial play in the shaft, because of the special provision which has been made for such axial movement, namely, the bearing formed with sleeve 71, cartridge 80 and the balls 72 and 73.

Although the present invention has been described in connection with a motor shaft mounting a grinding wheel, it should be apparent that it may be modified to accommodate any shaft or spindle irrespective of how it is used. Various modifications of this kind that are within the spirit and scope of the invention will no doubt occur to those skilled in the art so that the invention should not be deemed to be limited to the embodiments illustrated by way of example, but should be deemed to be limited only by the scope of the appended claims.

What is claimed is:

1. A bearing structure for a rotatable shaft including a first ball bearing to constrain the shaft to rotate, said first bearing having an inner ring rigidly mounted on said shaft, an outer ring concentric about said inner ring, and a ring of balls disposed between said rings; a second ball bearing to constrain said first bearing to move axially, said second bearing having inner and outer ball engaging members provided with radially spaced ball engaging surfaces, a row of balls disposed between said surfaces, and a cage to space the balls from one another angularly, said outer member being fixed and said inner member consisting in essence of a ring rigidly mounted on said outer ring and having a radially inwardly projecting flanged portion in face-to-face engagement with said outer ring; and a plurality of compression springs, said inner ball engaging member having a plurality of angularly spaced blind holes in one end thereof to retain the springs, each of said holes extending substantially parallel to the axis of said member, and said outer ball engaging member having a flanged portion extending radially inwardly adjacent the apertured end of said inner ball engaging member to compress the springs and thereby provide an axial pre-load on the shaft.

2. A bearing structure for a rotatable shaft including a first ball bearing rotatively supporting said shaft; a second non-rotative ball bearing supporting said first bearing radially while permitting limited axial movement of said first bearing, said second bearing including a cartridge member adapted to rigidly support said first bearing and having an outer peripheral ball engaging surface, and a fixed cap member adapted to provide an inner peripheral ball engaging surface concentric about said first-named surface, said surfaces serving as inner and outer raceways, respectively, for said second bearing; and resilient means disposed between said cartridge member and said fixed cap member to urge the former in a predetermined axial direction.

3. A bearing structure according to claim 2 including a third ball bearing rotatively supporting said shaft and being axially spaced from said first bearing; and means to resist movement of said third bearing in said predetermined axial direction.

4. A bearing structure according to claim 3 including a second cartridge member radially supporting said third bearing and having a spherically contoured outer surface; and a second fixed cap member provided with a tapered bore to receive said second cartridge member.

5. A bearing structure for a rotatable shaft including a first ball bearing rotatively supporting said shaft; a second non-rotative ball bearing supporting said first bearing radially while permitting limited axial movement of said first bearing, said second bearing including a cartridge member adapted to rigidly support said first bearing and having an outer peripheral ball engaging surface, and a fixed cap member adapted to provide an inner peripheral ball engaging surface concentric about said first-named surface, said surfaces serving as inner and outer raceways, respectively, for said second bearing; and spring means disposed between said cartridge member and said cap member to urge said cartridge member in a predetermined axial direction, said spring means being coaxially mounted on said cartridge member and projecting axially therefrom against said cap member.

6. A bearing structure for a rotatable shaft comprising a bearing housing member, a first ball bearing rotatively supporting said shaft; a cartridge member rigidly supporting said first bearing and being keyed to said housing member against rotation; a second ball bearing supporting said cartridge member radially while permitting axial displacement of the cartridge member relative to the housing member; a third ball bearing rotatively supporting said shaft at a point displaced axially from said first ball bearing, said second and third ball bearings being rigidly supported in said housing member; and spring means acting in an axial direction between said housing member and said cartridge member to urge the latter towards said third ball bearing.

7. A bearing structure according to claim 6 wherein said second ball bearing has an inner raceway formed with the outer peripheral surface of said cartridge member, an outer raceway formed by an inner peripheral surface in said housing member, and a complement of balls disposed between said peripheral surfaces, said balls having a diameter slightly greater than half the difference between the diameters of said peripheral surfaces.

References Cited in the file of this patent

UNITED STATES PATENTS

| 2,221,176 | Boll | Nov. 12, 1940 |
| 2,523,983 | Arms | Sept. 26, 1950 |

FOREIGN PATENTS

| 104,039 | Austria | Aug. 25, 1926 |
| 883,533 | Germany | July 20, 1953 |